(12) United States Patent
Cockerille et al.

(10) Patent No.: US 8,376,845 B2
(45) Date of Patent: Feb. 19, 2013

(54) PREVENTING A MEDIA DISPLAY FROM HIJACKING A GAMING MACHINE

(75) Inventors: Warner R. Cockerille, Sparks, NV (US); Bryan D. Wolf, Reno, NV (US)

(73) Assignee: IGT, Reno, NV (US)

( * ) Notice: Subject to any disclaimer, the term of this patent is extended or adjusted under 35 U.S.C. 154(b) by 89 days.

(21) Appl. No.: 12/885,745

(22) Filed: Sep. 20, 2010

(65) Prior Publication Data

US 2012/0071237 A1 Mar. 22, 2012

(51) Int. Cl.
 *A63F 9/24* (2006.01)
 *A63F 13/00* (2006.01)
 *G06F 17/00* (2006.01)
 *G06F 19/00* (2011.01)

(52) U.S. Cl. .............. 463/30; 463/29; 463/31; 463/37

(58) Field of Classification Search .............. 463/30
 See application file for complete search history.

(56) References Cited

U.S. PATENT DOCUMENTS

| 5,770,533 A | 6/1998 | Franchi |
| 6,712,698 B2 | 3/2004 | Paulsen et al. |
| 6,942,574 B1 | 9/2005 | LeMay et al. |
| 7,241,219 B2 | 7/2007 | Walker et al. |
| 7,285,049 B1 | 10/2007 | Luciano, Jr. et al. |
| 7,297,062 B2 | 11/2007 | Gatto et al. |
| 7,300,348 B2 * | 11/2007 | Kaminkow et al. ............ 463/17 |
| 2003/0060280 A1 | 3/2003 | Oles et al. |
| 2004/0127277 A1 * | 7/2004 | Walker et al. ................. 463/16 |
| 2008/0113802 A1 | 5/2008 | Johnson et al. |
| 2008/0132331 A1 * | 6/2008 | Gatto et al. .................... 463/31 |
| 2011/0028203 A1 * | 2/2011 | Agarwal et al. ............... 463/20 |

FOREIGN PATENT DOCUMENTS

| DE | 19756693 A1 | 6/1999 |
| GB | 2393027 A | 3/2004 |

OTHER PUBLICATIONS

An extended EP search report, dated Dec. 1, 2011, for co-pending EP patent application No. EP 11180890 (7 pgs).

* cited by examiner

*Primary Examiner* — Michael Cuff
*Assistant Examiner* — Kevin Y Kim
(74) *Attorney, Agent, or Firm* — Richard E. Billion; Clise, Billion & Cyr, P.A.

(57) ABSTRACT

A gaming machine includes a display device and a processor coupled to the display device. The processor is configured to monitor at least one display property of a media display on the display device, detect that the at least one display property is equal or greater than a preselected threshold, and generate an alert in response to the detection.

19 Claims, 4 Drawing Sheets

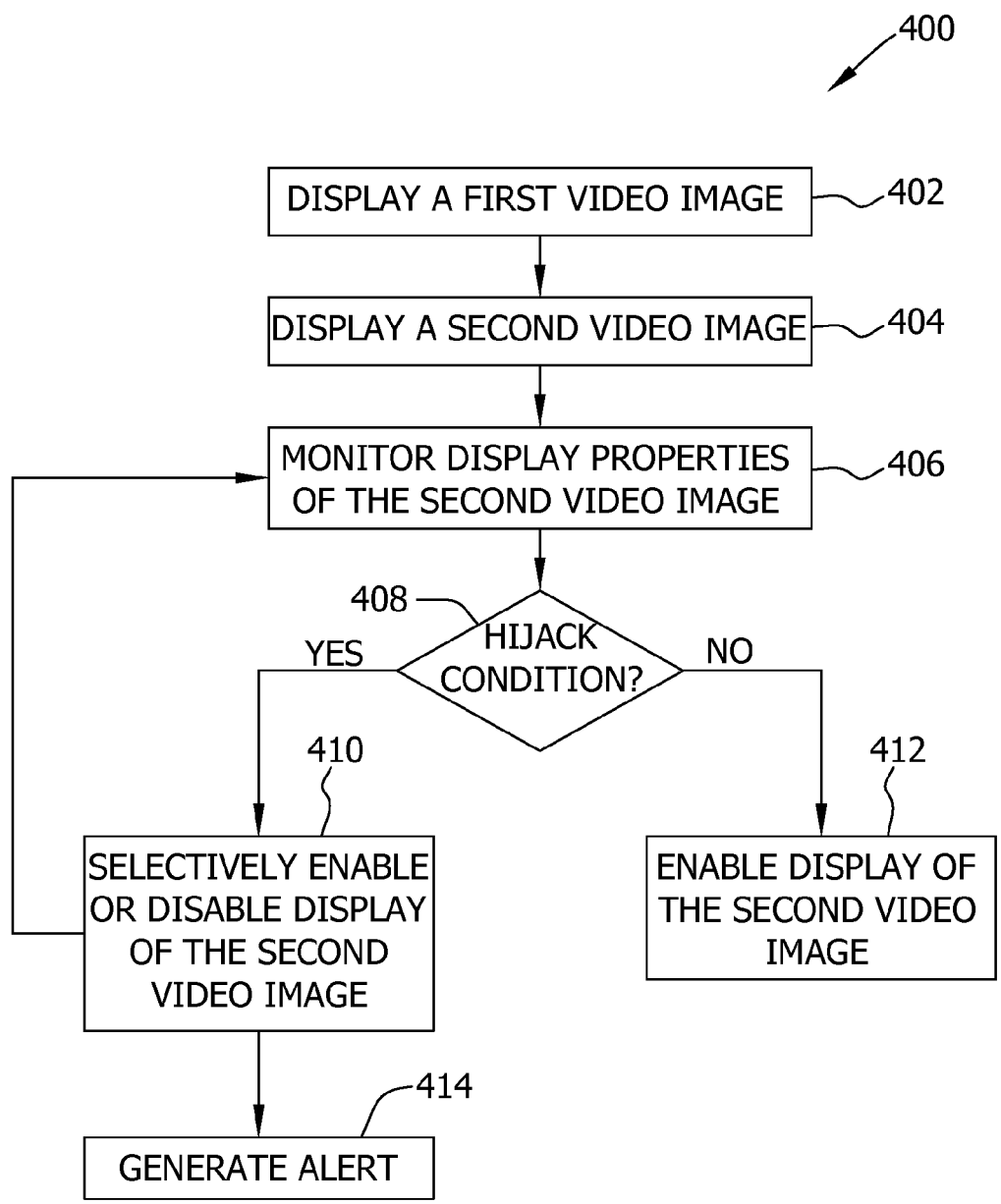

PREVENTING A MEDIA DISPLAY FROM HIJACKING A GAMING MACHINE

BACKGROUND

The embodiments described herein relate generally to electronic gaming machines and, more particularly, to systems and methods for use in preventing the undesirable use of a gaming machine by an outside process.

Current functionality of at least some known gaming machines enables a media display to be opened on a game screen to augment the game play experience with functionality such as bonusing and player tracking. However, known functionality may also provide an infrastructure to graphically control operation of the entire gaming machine by displaying a full screen "game overlay" media display. For example, at least some known game overlay media displays include button functionality that enables complete player interaction with the game provided by the overlay rather than the game provided by the base software within the gaming machine.

Moreover, modern communication protocols enable sufficient information to be exchanged between the gaming machine and one or more servers such that a server is capable of tracking when money is inserted and/or received by a player, when game play is started on the gaming machine, the number and amount of wagers made by the player, when a bonus is obtained, and/or when game play completes. At least some known servers also control the amount of money at stake in the gaming machine, in form of electronic credits, and/or control game outcomes that are then displayed by the gaming machine. Although the exchange of such information is useful, such functionality also facilitates the use of overlays for playing games that are not provided or intended for use with the gaming machines.

BRIEF DESCRIPTION

In one aspect, a gaming machine includes a display device and a processor coupled to the display device. The processor is configured to monitor at least one display property of a media display on the display device, detect that the at least one display property is equal or greater than a preselected threshold, and generate an alert in response to the detection.

In another aspect, a method includes displaying a first video image and a second video image via a display device, monitoring at least one display property of the second video image, detecting a hijacking condition by the second video image, and generating an alert in response to the hijacking condition.

In another aspect, one or more computer-readable storage media are provided with computer-executable components, including a display component that when executed by at least one processor causes the processor to display a first video image and a second video image via a display device, and a detection component that when executed by at least one processor causes the processor to detect a hijacking condition when the second video image includes at least one display property that violates a corresponding display condition.

In yet another aspect, a gaming machine controller includes a memory area configured to store data representative of a game image, and a processor coupled to the memory area. The processor is configured to monitor at least one display property of a media display on a display device, detect that the at least one display property is equal or greater than a preselected threshold, and generate an alert in response to the detection.

BRIEF DESCRIPTION OF THE DRAWINGS

FIG. 4 is a flowchart illustrating an exemplary method for detecting a hijack state of the gaming machine shown in FIG. 1.

DETAILED DESCRIPTION

Exemplary embodiments of apparatus, methods, and computer-readable storage media having computer-executable components for use in preventing a media display from hijacking a gaming machine are described herein. The embodiments described herein facilitate providing a course of action for a gaming machine manufacturer to prevent an undesired and/or unauthorized configuration or use of a gaming machine. Moreover, the embodiments described herein maintain adherence to required gaming industry standards with regard to communication and/or display of games, services offered to players, and the like.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

Figure 1:
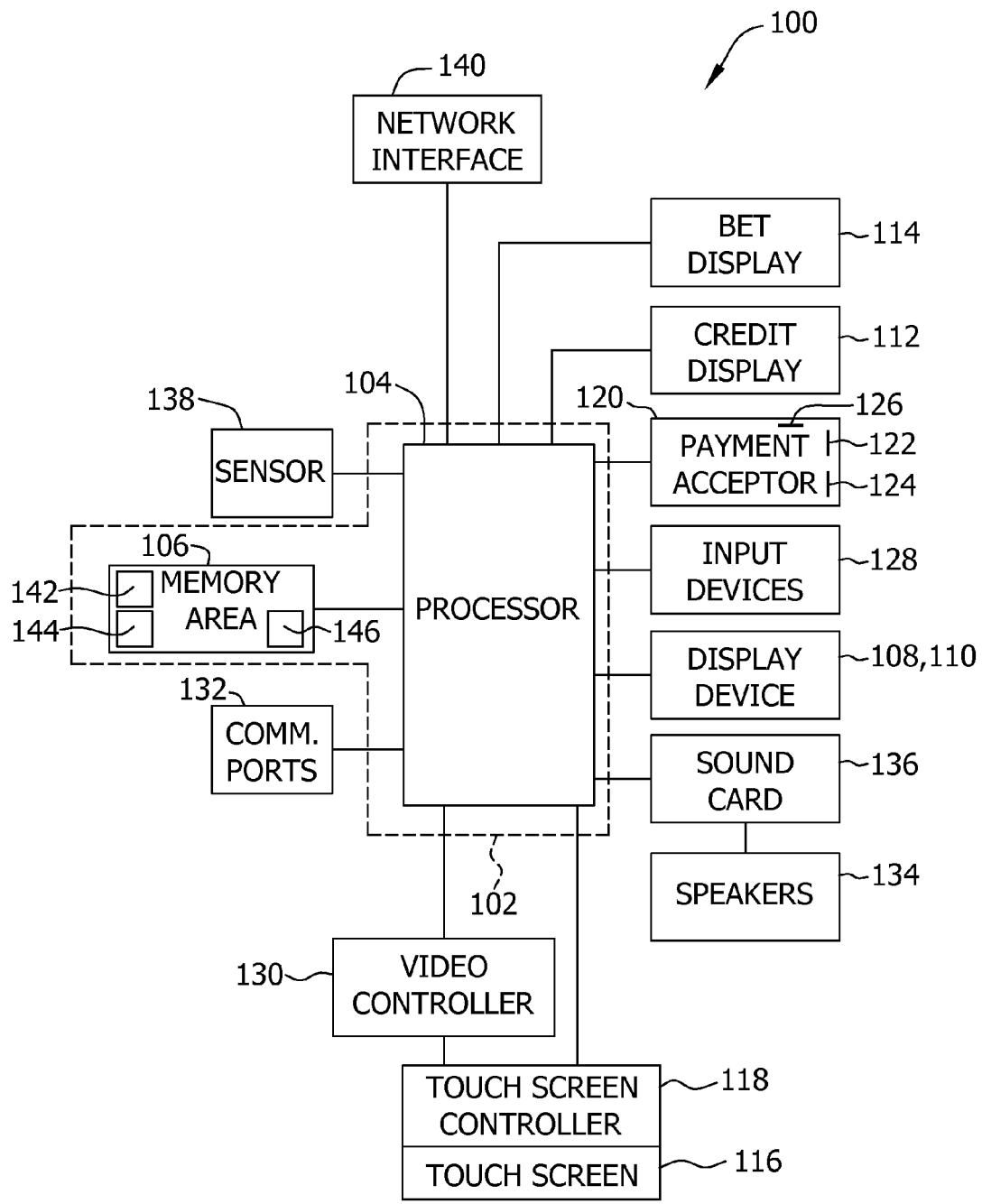
FIG. 1 is a schematic block diagram of an exemplary gaming machine.

FIG. 1 is a schematic block diagram of an exemplary gaming machine 100. In the exemplary embodiment, gaming machine 100 includes a gaming machine controller 102 including at least one processor 104, such as a microprocessor, a microcontroller-based platform, a suitable integrated circuit or one or more application-specific integrated circuits (ASICs). Processor 104 is coupled with or operable to access or to exchange signals with at least one data storage or memory area 106. In one embodiment, processor 104 and memory area 106 reside within a cabinet (not shown in FIG. 1) of gaming machine 100. Processor 104 and memory area 106 may be collectively referred to herein as a "computer" or "controller."

Memory area 106 stores program code and instructions, executable by processor 104, to control gaming machine 100. Memory area 106 also stores other data such as image data, event data, player input data, random or pseudo-random number generators, pay-table data or information and applicable game rules that relate to the play of gaming machine 100. Memory area 106 may include one, or more than one, forms of memory. For example, memory area 106 can include random access memory (RAM), which can include non-volatile RAM (NVRAM), magnetic RAM (MRAM), ferroelectric RAM (FeRAM) and other forms of memory. Memory area 106 may also include read only memory (ROM), flash memory and/or Electrically Erasable Programmable Read Only Memory (EEPROM). Any other suitable magnetic, optical and/or semiconductor memory, by itself or in combination with other forms of memory, may be included in memory area 106. Memory area 106 may also be, or include, a detachable or removable memory, including, but not limited to, a suitable cartridge, disk, CD ROM, DVD or USB memory. A player can use such removable memory in a desktop, a laptop personal computer, a personal digital assistant (PDA) or other computerized platform.

In one embodiment, gaming machine 100 randomly generates awards and/or other game outcomes based on probability data. That is, each award or other game outcome is associated with a probability and gaming machine 100 generates the award or other game outcome to be provided to the player based on the associated probabilities. In this embodiment, because gaming machine 100 generates outcomes randomly or based upon a probability calculation, there is no certainty that gaming machine 100 will ever provide the player with any specific award or other game outcome. Such random determination could be provided through utilization of a random number generator (RNG), such as a true random number generator, a pseudo random number generator or other suitable randomization process.

In another embodiment, gaming machine 100 employs a predetermined or finite set or pool of awards or other game outcomes. In this embodiment, as each award or other game outcome is provided to the player, gaming machine 100 removes the provided award or other game outcome from the predetermined set or pool. Once removed from the set or pool, the specific provided award or other game outcome cannot be provided to the player again. This type of gaming device provides players with all of the available awards or other game outcomes over the course of the play cycle and guarantees the amount of actual wins and losses.

In yet another embodiment, upon a player initiating game play at gaming machine 100, gaming machine 100 enrolls in a bingo game. In this embodiment, a bingo server calls the bingo balls that result in a specific game outcome. The resultant game outcome is communicated to the individual gaming machine 100 to be provided to a player.

Referring still to FIG. 1, gaming machine 100 includes one or more display devices 108, 110 that are controlled by controller 102. Display devices 108 and 110 are mounted to the cabinet of gaming machine 100. Gaming machine 100 includes a central display device 108, which displays a primary game. Display device 108 may also display any secondary game associated with the primary game as well as information relating to the primary or secondary game. Display device 110 may, for example, be an upper display device 110. Upper display device 110 may display the primary game, any suitable secondary game associated with the primary game and/or information relating to the primary or secondary game. At least one display device 108 and 110 may be a mobile display device, such as a PDA or tablet PC that enables play of at least a portion of the primary or secondary game at a location remote from other components of gaming machine 100.

In the exemplary embodiment, gaming machine 100 includes a credit display 112, which displays a player's current number of credits, cash, account balance or the equivalent. Gaming machine 100 also includes a bet display 114 which displays a player's amount wagered. Credit display 112 and bet display 114 may be standalone displays independent of display devices 108 and 110, or credit display 112 and bet display 114 may be incorporated into display devices 108 and/or 110.

Display devices 108 and/or 110 may include, without limitation, a monitor, a television display, a plasma display, a liquid crystal display (LCD), a display based on light emitting diodes (LED), a display based on a plurality of organic light-emitting diodes (OLEDs), a display based on polymer light-emitting diodes (PLEDs), a display based on a plurality of surface-conduction electron-emitters (SEDs), a display including a projected and/or reflected image or any other suitable electronic device or display mechanism. In one embodiment, as described in more detail below, display devices 108 and/or 110 includes a touch-screen 116 with an associated touch-screen controller 118. Display devices 108 and/or 110 may be of any suitable configuration, such as a square, a rectangle or an elongated rectangle. Touch-screen 116 is coupled with touch-screen controller 118, or some other touch-sensitive display overlay to enable player interaction with the images on display devices 108 and/or 110.

Display devices 108 and/or 110 are configured to display one or more game or other suitable images, symbols and indicia such as any visual representation or exhibition of the movement of objects such as mechanical, virtual or video reels and wheels, dynamic lighting, video images, images of people, characters, places, things and faces of cards, tournament advertisements and the like.

In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one and preferably a plurality of game or other suitable images, symbols or indicia with an electronic display overlay.

Still referring to FIG. 1, gaming machine 100 includes at least one payment acceptor 120 in communication with controller 102. Payment acceptor 120 includes a coin slot 122 and a payment, note or bill acceptor 124, where the player inserts money, coins or tokens. The player can place coins in coin slot 122 or paper money, ticket or voucher into payment, note or bill acceptor 124. Devices such as a card reader or validator 126 for credit cards, debit cards or credit slips may be used to accept payment. An identification card and/or a smart card having a programmed microchip or a magnetic strip coded with a player's identification, credit totals and other relevant information may be used. In one embodiment, money may be transferred to a gaming machine through electronic funds transfer (EFT). When a player funds gaming machine 100, controller 102 determines the amount of funds entered and displays the corresponding amount on credit display 112 as described above.

Gaming machine 100 also includes one or more input devices 128 that are communicatively coupled to controller 102. Input devices 128 include any suitable device which enables the player to produce an input signal which is readable by controller 102. In one embodiment, input device 128 is a game activation device, such as a pull arm or a play button which is used by the player to start any primary game or sequence of events in gaming machine 100. The play button can be any suitable play activator. In one embodiment, upon appropriate funding, gaming machine 100 begins the game play automatically. In another embodiment, upon the player engaging one of the play buttons, gaming machine 100 automatically activates game play.

One input device 128 may be a "Bet One" button. The player places a bet by pushing the Bet One button. The player can increase the bet by one credit each time the player pushes the Bet One button. When the player pushes the Bet One button, the number of credits shown in credit display 112 decrements by one, and the number of credits shown in bet display 114 increments by one. Another input device may be a "Bet Max" button which enables the player to bet the maximum wager permitted for a game of gaming machine 100.

Yet another input device 128 may be a "Cash Out" button. The player may push the Cash Out button to receive a cash payment or other suitable form of payment corresponding to the number of remaining credits. When the player cashes out, the player receives the coins or tokens in a coin payout tray (not shown in FIG. 1) or other payout mechanisms, such as tickets or credit slips, redeemable by a cashier, or funding to the player's electronically recordable identification card.

Touch-screen 116 and touch-screen controller 118 are communicatively coupled to a video controller 130. A player can make decisions and input signals into gaming machine 100 by touching touch-screen 116 at appropriate places. Gaming machine 100 also includes one or more communication ports 132 that enable communication of controller 102 with external peripherals (not shown in FIG. 1), such as, but not limited to, external video sources, expansion buses, game or other displays, a SCSI port or a key pad.

In the exemplary embodiment, gaming machine 100 includes a sound generating device 134 that is controlled by one or more sounds cards 136, which function in conjunction with controller 102. Sound generating device 134 includes at least one speaker or other sound generating hardware and/or software for generating sounds, such as playing music for the primary and/or secondary game or for other modes of gaming machine 100, such as an attract mode. Gaming machine 100 provides dynamic sounds coupled with attractive multimedia images displayed on one or more of display devices 108 and/or 110 to provide an audio-visual representation or to otherwise display full-motion video with sound to attract players to gaming machine 100. During idle periods, gaming machine 100 may display a sequence of audio and/or visual attraction messages to attract potential players to gaming machine 100. The videos may also be customized for or to provide any appropriate information.

In the exemplary embodiment, gaming machine 100 includes a sensor 138, such as a camera communicatively coupled to and/or controlled by controller 102. Sensor 138 is selectively positionable to acquire an image of a player actively using gaming machine 100 and/or an area surrounding gaming machine 100. In one embodiment, the camera may selectively acquire still or moving (e.g., video) images and may acquire the images in either an analog, digital or other suitable format. Display devices 108 and/or 110 may display the image acquired by the camera, as well as display the visible manifestation of the game in split screen or picture-in-picture fashion. For example, the camera may acquire an image of the player and the processor may incorporate that image into the primary and/or secondary game as a game image, symbol or indicia. Furthermore, gaming machine 100 is capable of communicatively coupling to a network (not shown in FIG. 1) via a network interface 140.

Gaming machine 100 can incorporate any suitable wagering primary or base game. Gaming machine 100 may include some or all of the features of conventional gaming machines or devices. The primary or base game may comprise any suitable reel-type game, card game, number game or other game of chance susceptible to representation in an electronic or electromechanical form which produces a random outcome based on probability data upon activation from a wager. That is, different primary wagering games, such as video poker games, video blackjack games, video Keno, video bingo or any other suitable primary or base game may be implemented.

In some embodiments, memory area 106 includes one or more computer-readable storage media having computer-executable components. An exemplary component is a display component 142 that controls, for example, video controller 130 and/or display devices 108 and 110. For example, display component 142 controls display of a first video image that represents a game and display of a second video image that represents a media display. Another exemplary component is a detection component 144 that detects when the second video image has one or more display properties that meet or exceed corresponding thresholds. Yet another exemplary component is a security component 146 that selectively enables and disables display of the second video image, as described in greater detail below.

Figure 2:
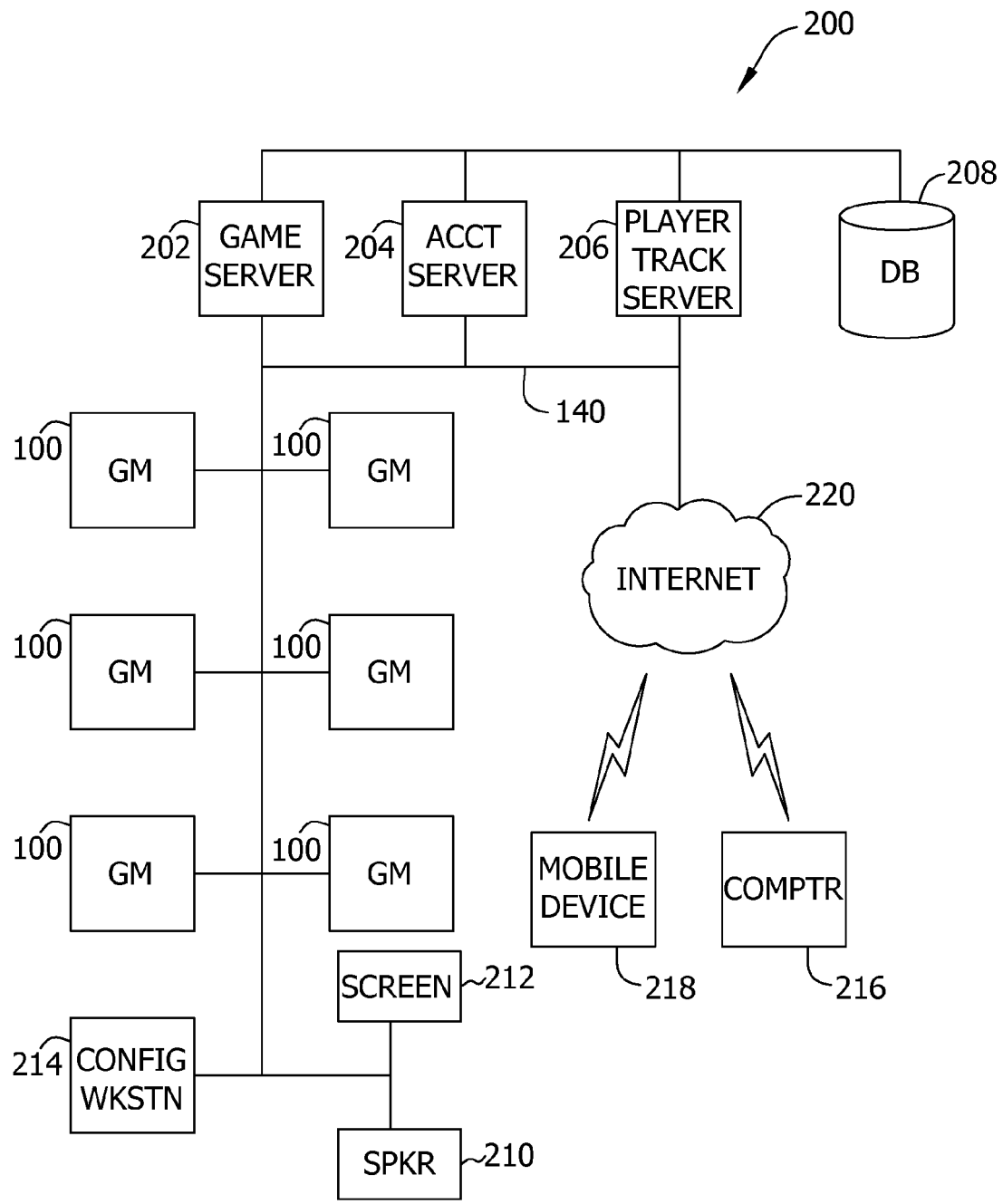
FIG. 2 is a block schematic diagram of an exemplary gaming system that includes a plurality of gaming machines a shown in FIG. 1.

FIG. 2 is a block schematic diagram of an exemplary gaming system 200 that includes a plurality of gaming machines 100. Each gaming machine 100 is coupled via a network connection 140 to one or more servers, such as a game server 202, an accounting server 204, and a player tracking server 206. Each server 202, 204, and 206 includes a processor (not shown) that enables data communication between each gaming machine 100 and other components of gaming system 200. Such data is stored in, for example, a database 208 coupled to each server 202, 204, and 206. Moreover, each server 202, 204, and 206 also includes audio capabilities, such as a CD-ROM drive (not shown) or DVD-ROM drive (not shown), that are coupled to a sound card (not shown) for processing and transmitting digitized sound effects to one or more speakers 210 in response to commands issued over gaming system 200 by a corresponding server 202, 204, and/or 206. Each server 202, 204, and 206 is also coupled via gaming system 200 to an electronic sign or screen 212 that displays information, such as via scrolling and/or flashing messages that indicate, for example, progressive and/or jackpot amounts, and that are visible to players playing gaming machines 100. Messages for display on each electronic screen 212 are generated and/or modified in response to commands issued over gaming system 200 by servers 202, 204, and/or 206.

As described above, gaming machines 100 may include video poker machines, video slot machines, and/or other similar gaming machines that implement alternative games. Moreover, gaming machines 100 may be terminal-based machines, wherein the actual games, including random number generation and/or outcome determination, are performed at a server, such as servers 202, 204, and/or 206. In such an embodiment, gaming machine 100 displays results of the game via displays devices 108 and/or 110 (shown in FIG. 1).

Moreover, in the exemplary embodiment, gaming system 200 includes a configuration workstation 214 that includes a user interface that enables an administrator to set up and/or to modify portions of gaming system 200 and/or servers 202, 204, and 206. Player tracking server 206 tracks data of players using gaming machines 100, and also controls messages that appear on each display device 108 and/or 110 of gaming machines 100. In the exemplary embodiment, player tracking server 206 also stores physical characteristics of players, such as, but not limited to, the player age and/or vision data. Game server 202 controls bonus applications or bonus systems that award bonus opportunities on gaming system 200. Moreover, game server 202 includes a set of rules for awarding jackpots in excess of those established by winning pay tables (not shown) of each gaming machine 100. Some bonus awards may be awarded randomly, while other bonus awards may be made to groups of gaming machines 100 operating in a progressive jackpot mode. Player tracking server 206 may store data related to the players and tracked using player tracking identification, such as a player card. Moreover, player tracking server 206 may store information and data about the player such as loyalty points, player address, phone number, and/or any information that may be retrieved and transmitted to the game server 202. Accounting server 204 may store and track information such as, but not limited to, the average amount of wager played by the player, and/or any funds the player may have in an account.

Furthermore, in the exemplary embodiment, gaming system 200 includes one or more remote computers 216 and/or mobile devices 218 that access gaming system 200 via an external network, such as the Internet 220.

Figure 3:
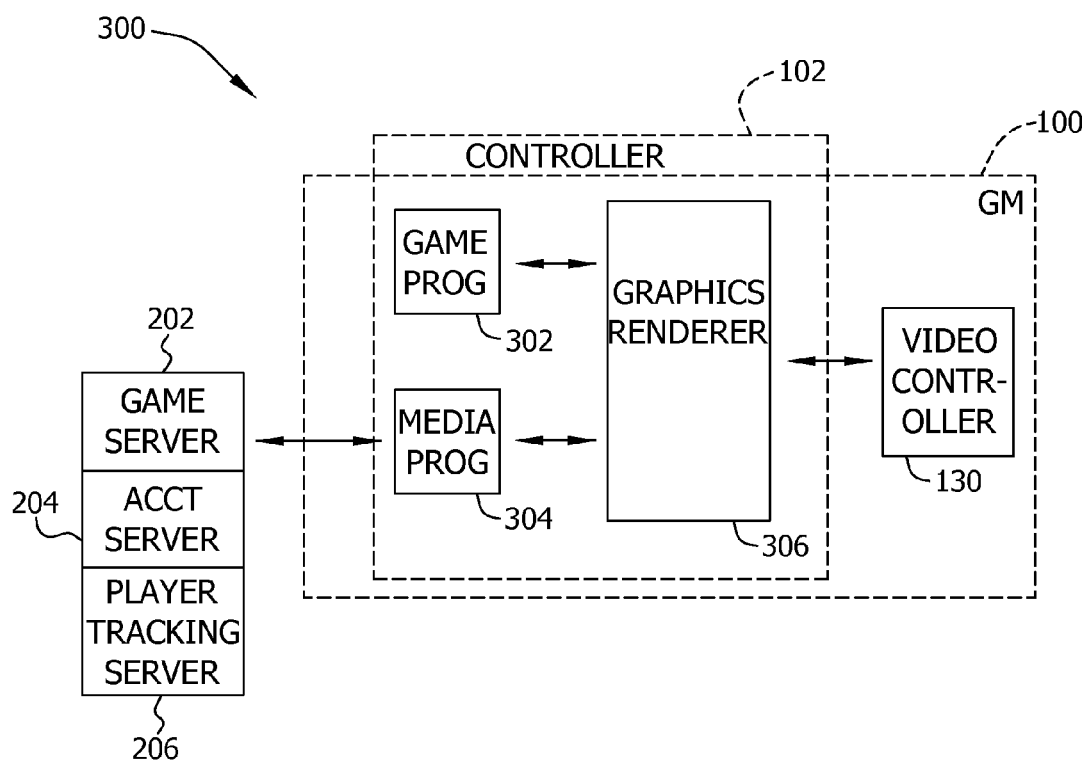
FIG. 3 is a block functional diagram of the gaming machine shown in FIG. 1.

FIG. 3 is a block functional diagram 300 of gaming machine 100. In the exemplary embodiment, gaming machine controller 102 (shown in FIG. 1) includes one or more game programs 302, a media display program 304, and a graphics renderer 306. Each program 302, 304, and 306 may be stored by, for example, memory area 106 (shown in FIG. 1) for execution by processor 104 (shown in FIG. 1). In an alternative embodiment, programs 302, 304, and/or 306 are stored by memory area 106 for execution by video controller 130. In the exemplary embodiment, each game program 302 includes, for example and not by way of limitation, attraction graphics and sounds, primary game graphics and sounds, bonus game graphics and sounds, one or more paytables, celebration graphics and sounds, graphics representative of player interaction buttons, and/or tilt condition graphics and sounds. In addition, each game program 302 includes critical objects associated with a game, such as a credit meter, a current wager meter, and a win meter.

Moreover, media display program 304 may be a service window program that includes, for example, graphics and sound for use in enabling player tracking services, service calls from gaming machine 100, ordering refreshments and/or food from gaming machine 100, and any other suitable services that may be offered to a player by a casino or gaming machine manufacturer. Notably, media display program 304 may be executed based on commands and/or data that are received from a server, such as servers 202, 204, and/or 206. In some embodiments, graphics for display via media display program 304 are received by gaming machine 100 from a separate video source. Alternatively, media display program 304 receives the graphics from a separate module within gaming machine 100. For example, the game graphics may be sent to graphics renderer 306 from a presentation process. Moreover, media display graphics may be sent to graphics renderer 306 from a multimedia player, such as a FLASH® player (FLASH® is a registered trademark of Adobe Systems Incorporated, San Jose, Calif., USA). Graphics renderer 306 uses the source of the various graphics elements to determine which elements are game graphics and which elements are media display graphics.

In the exemplary embodiment, graphics renderer 306 determines and/or monitors display positions, such as display coordinates, of elements of game programs 302 and media display program 304. For example, graphics renderer 306 monitors, such as continuously or periodically monitors, display coordinates of the critical objects associated with a currently-enabled game program 302, and stores data representative of the display coordinates in memory 106. The critical objects may be marked with one or more tags that identify the critical objects to graphics renderer 306. For example, a text box, such as a credit meter display, may specify a display position, size, font, and/or color of the text box. Moreover, the text box for the credit meter display may include a tag that identifies the text box as a critical object that should not be obscured by unknown or unlicensed display objects. A different text box, such as a "Play All Lines" text box, for example, may not be identified as a critical object, and would include tags that specify a display position, size, font, and/or color. In addition, graphics renderer 306 monitors, such as continuously or periodically monitors, display coordinates of media display program 304 such that graphics renderer 306 is capable of detecting that display of graphics elements of media display program 304 obscure graphics elements of game program 302, such as the critical elements. Other display properties that may be monitored by graphics renderer 306 include, but are not limited to, dimensions of graphics elements of media display program 304 and/or an opacity of graphics elements of media display program 304.

Furthermore, graphics renderer 306 determines whether media display program 304 is being executed by processor 104 in a hijack state such that gaming machine 100 has effectively become a slave to an outside process via media display program 304. For example, graphics renderer 306 can detect when media display program 304 obscures one or more critical objects for more than a predetermined period of time by detecting an initial obscuring and initiating a timer. Alternatively, graphics renderer 306 can detect when media display program 304 obscures more than a preselected threshold percentage of area needed by game program 302. Alternatively, graphics renderer 306 can detect when media display program 304 covers a threshold percentage of display area available on display device 108 or 110 (shown in FIG. 1). Moreover, graphics renderer 306 can detect when media display program 304 has one or more display dimensions that are equal to or greater than a threshold value. Furthermore, graphics renderer 306 can detect when media display program 304 has one or more graphic elements that have an opacity equals or exceeds a threshold value. In an alternative embodiment, graphics renderer 306 passes data to video controller 130 to perform a check for a hijack state.

When graphics renderer 306 detects a hijack condition, graphics renderer 306 generates an alert, creates an error log entry, and/or requests an authorization code from the origin of media display program 304, such as servers 202, 204, and/or 206. Alternatively, graphics renderer 306 may simply deny display of media display program 304 when graphics renderer 306 detects a hijack condition. In addition, graphics renderer 306 detects when other conditions exist, such as a tilt condition or a celebration condition relating to game program 302, and enables media display program 304 to continue display via display device 108 or 110.

FIG. 4 is a flowchart 400 illustrating an exemplary method for detecting a hijack state of a gaming machine, such as gaming machine 100 (shown in FIG. 1) by a process, such as a media display program 304 (shown in FIG. 3). In the exemplary embodiment, gaming machine 100 displays 402 a first video image. For example, the first video image may include graphics elements according to game program 302 (shown in FIG. 3), including one or more critical objects. In some embodiments, game program 302 declares the desired display coordinates of the critical objects, and graphics renderer 306 (shown in FIG. 3) stores the display coordinates in memory area 106 (shown in FIG. 1). In addition, graphics renderer 306 monitors, such as continuously or periodically monitors, the display coordinates of the critical objects to determine whether any of the critical objects are obscured on a display device, such as central display device 108 or upper display device 110 (both shown in FIG. 1).

Moreover, in the exemplary embodiment, gaming machine 100 displays 404 a second video image. Graphics elements in the second video image may be controlled by game program 302 in a celebration condition or in a tilt condition, or may be controlled by media display program 304. For example, media display program 304 may receive data and/or commands from a remote computer, such as server 202, 204, and/or 206 (shown in FIG. 2). Gaming machine 100 monitors 406, such as continuously or periodically monitors, display properties of the second video image and detects 408 a hijack condition based on that monitoring. If graphics renderer 306 detects 408 the hijack condition, graphics renderer 306 selectively enables or disables 410 display of the second video image. If graphics renderer 306 does not detect 408 the hijack condition, graphic renderer 306 enable 412 display of the second video image. In addition, graphics renderer 306 continues to monitor 406 the display properties of the second video image to detect 408 the hijack condition.

For example, in the exemplary embodiment, graphics renderer 306 compares display coordinates of graphic elements of the second video image with the stored display coordinates of the critical objects within game program 302. If one or more of the critical objects is obscured by the second video image, graphics renderer 306 initiates a timer and determines whether the critical objects are obscured for a preselected time period. If graphics renderer 306 determines that the critical objects are obscured for at least the preselected time period, graphics renderer 306 requests an authorization code from media display program 304. The authorization code may then be obtained from the originator of the process, such as server 202, 204, and/or 206. Graphics renderer 306 verifies the authorization code using any suitable verification process, and enables or disables further display of the second video image based on the result. Alternatively, graphics renderer 306 may simply disable display of the second video image either entirely or in the display coordinates defined for the critical objects.

In an alternative embodiment, graphics renderer 306 determines a percentage of central display device 108 or upper display device 110 that is being requested or used to display the second video image. If the percentage is equal to or greater than a preselected threshold percentage, graphics renderer 306 selectively disables or enables further display of the second video image as described above. In another alternative embodiment, prior to display of the second video image, graphics renderer 306 determines whether one or more critical elements of the first video image or a threshold percentage of first video image would be obscured by the second video image. In such an embodiment, graphics renderer 306 disables display of the second video image.

In another alternative embodiment, graphics renderer 306 determines the display dimensions of the second video image based on the display coordinates of the second video image. If one or more of the display dimensions are equal to or greater than a preselected threshold value, graphics renderer 306 selectively disables or enables further display of the second video image as described above. In yet another alternative embodiment, graphics renderer 306 determines color properties of graphics elements of the second video image, such as an opacity of the second video image. If, for example, the opacity of one or more graphics elements of the second video image is greater than a threshold value, graphics renderer 306 selectively disables or enables further display of the second video image as described above. Moreover, in another alternative embodiment, graphics renderer 306 determines whether the second video image includes any words, phrases, or images that are included in a player-selected or casino-selected list. If such items are detected, graphics renderer 306 selectively disables or enables further display of the second video image as described above. In yet another alternative embodiment, graphics renderer 306 detects whether the second video image obscures graphics elements of the first video image that are included in a list selected by the player, casino, or game manufacturer. For example, the game manufacturer may wish for its logo to be permanently displayed.

In the exemplary embodiment, gaming machine 100 also detects alternate conditions that mitigate obscuring of the first video image by the second video image. For example, gaming machine controller 102 may detect a tilt condition during play of game program 302, and media display program 304 may control display of graphics associated with the tilt condition such that the graphics obscure one or more of the critical objects of the first video image and/or the threshold percentage of the first video image. During the tilt condition, graphics renderer 306 enables obscuring of the first video image in order to alert the player and/or casino service personnel of the tilt condition. Similarly, game program 302 may include celebration graphics for display as the second video image during a celebration condition. During the celebration condition, graphics renderer 306 enables obscuring of the first video image in order to facilitate offering additional excitement to the player. In some embodiments, graphics renderer 306 continues to monitor the second video image in order to detect technical issues that result in prolonged obscuring of the first video image.

In the exemplary embodiment, and regardless of whether additional display of the second video image is enabled, gaming machine 100 generates 414 an alert. For example, gaming machine controller 102 may generate an entry in an event log that is stored in memory area 106 or that is transmitted to server 202, 204, or 206. Moreover, gaming machine controller 102 may transmit a service request to casino service personnel and/or to server 202, 204, or 206.

The above-described alternative embodiment includes benefits to casinos, gaming machine manufacturers, and players alike. For example, casinos gain valuable repeat business from players that enjoy uninterrupted play of a desired game. Gaming machine manufacturers gain an ability to prevent unauthorized access and control of outside processes that may be capable of using the full functionality of a gaming machine in ways that were not intended by the manufacturer. In addition, players benefit by being assured that the game being played was indeed developed for the gaming machine to meet the requirements of gaming industry standards and gaming manufacturer standards.

As will be appreciated based on the foregoing specification, the above-described embodiments of the disclosure may be implemented using computer programming or engineering techniques including computer software, firmware, hardware or any combination or subset thereof, wherein the technical effect is preventing undesirable control of gaming machine functionality via a "game overlay" media display that includes customized themes and/or display elements. Any such resulting program, having computer-readable code means, may be embodied or provided within one or more computer-readable media, thereby making a computer program product, i.e., an article of manufacture, according to the discussed embodiments of the disclosure. The computer readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The term "processor," as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 104, including RAM memory, ROM memory, EPROM memory, EEPROM memory, and non-volatile RAM (NVRAM) memory. The above memory types are exemplary only, and are thus not limiting as to the types of memory usable for storage of a computer program.

A computer or controller, such as those described herein, includes at least one processor or processing unit and a system memory. The computer or controller typically has at least some form of computer readable media. By way of example and not limitation, computer readable media include computer storage media and communication media. Computer storage media include volatile and nonvolatile, removable and non-removable media implemented in any method or technology for storage of information such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Combinations of any of the above are also included within the scope of computer readable media.

Although the present invention is described in connection with an exemplary gaming system environment, embodiments of the invention are operational with numerous other general purpose or special purpose gaming system environments or configurations. The gaming system environment is not intended to suggest any limitation as to the scope of use or functionality of any aspect of the invention. Moreover, the gaming system environment should not be interpreted as having any dependency or requirement relating to any one or combination of components illustrated in the exemplary operating environment. Examples of well known gaming systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program components or modules, executed by one or more computers or other devices. Aspects of the invention may be implemented with any number and organization of components or modules. For example, aspects of the invention are not limited to the specific computer-executable instructions or the specific components or modules illustrated in the figures and described herein. Alternative embodiments of the invention may include different computer-executable instructions or components having more or less functionality than illustrated and described herein.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A gaming machine comprising:
   a display device;
   a processor coupled to said display device and configured to:
      monitor at least one display property of a media display on said display device to prevent an unauthorized configuration of the gaming machine;
      detect the unauthorized configuration of at least one display property; and
      generate an alert in response to the detection, wherein the at least one display property is a display position of the media display.

2. The gaming machine according to claim 1, wherein said processor is configured to detect that the display position of at least one critical object is obscured by the media display.

3. The gaming machine according to claim 2, wherein the at least one critical object includes at least one of a credit meter, a current wager meter, a win meter, and at least one player interaction button.

4. The gaming machine according to claim 1, wherein the at least one display property is a percentage of display area of said display device used to display the media display.

5. A gaming machine comprising:
   a display device;
   a processor coupled to said display device and configured to:
      monitor at least one display property of a media display on said display device;
      detect that the at least one display property is equal or greater than a preselected threshold; and
   generate an alert in response to the detection, wherein the at least one display property is a display dimension of the media display.

6. The gaming machine according to claim 1, wherein the at least one display property is an opacity of a graphic element of the media display.

7. The gaming machine according to claim 1, wherein said processor is further configured to detect a game condition and to enable the media display to obscure the at least one critical object during the game condition.

8. The gaming machine according to claim 1, wherein said processor is further configured to:
   initiate a timer upon detecting that the at least one display property is equal to or greater than the threshold; and
   generate the alarm when the at least one display property is equal to or greater than the threshold for a preselected time period.

9. The gaming machine according to claim 1, wherein said processor is further configured to disable the media display on said display device in response to detecting that the at least one display property is equal to or greater than the threshold.

10. The gaming machine according to claim 1, wherein said processor is further configured to request an authorization code from the media display in response to detecting that the at least one display property is equal to or greater than the threshold.

11. The gaming machine according to claim 8, wherein said processor is further configured to:
receive the authorization code from the media display;
verify authentication of the media display using the authorization code; and
enable display of the media display via said display device.

12. The gaming machine according to claim 1, wherein said processor comprises one of a gaming machine controller and a video controller.

13. A gaming machine controller comprising:
a memory area configured to store data representative of a game image; and
a processor coupled to said memory area and configured to:
monitor at least one display property of a media display on a display device;
detect that the at least one display property is an unauthorized configuration; and
generate an alert in response to the detection of an unauthorized configuration, wherein the at least one display property is a display position of the media display.

14. The gaming machine controller according to claim 13, wherein said processor is configured to detect that the display position of at least one critical object is obscured by the media display.

15. The gaming machine controller according to claim 13, wherein said processor is configured to detect that the display position of at least one critical object is obscured by the media display for a preselected time period.

16. A gaming machine controller comprising:
a memory area configured to store data representative of a game image; and
a processor coupled to said memory area and configured to:
monitor at least one display property of a media display on a display device;
detect that the at least one display property is equal or greater than a preselected threshold; and
generate an alert in response to the detection, wherein the at least one display property is a display dimension of the media display.

17. The gaming machine controller according to claim 13, wherein the at least one display property is an opacity of a graphic element of the media display.

18. The gaming machine controller according to claim 13, wherein said processor is further configured to disable the media display on the display device in response to detecting that the at least one display property is equal to or greater than the preselected threshold.

19. The gaming machine controller according to claim 13, wherein said processor is further configured to request an authorization code from the media display in response to detecting that the at least one display property is in an unauthorized configuration.

* * * * *